(12) United States Patent
Ben-Artzi et al.

(10) Patent No.: US 8,650,544 B2
(45) Date of Patent: Feb. 11, 2014

(54) SYSTEMS AND METHODS FOR INTERACTIVE TESTING OF A COMPUTER APPLICATION

(75) Inventors: Guy Ben-Artzi, Palo Alto, CA (US); Yotam Shacham, Palo Alto, CA (US); Yehuda Levi, Rishon Lezion (IL); Neeraj Gupta, Palo Alto, CA (US)

(73) Assignee: Beek Fund B.V. L.L.C., Dover, DE (US)

( * ) Notice: Subject to any disclaimer, the term of this patent is extended or adjusted under 35 U.S.C. 154(b) by 440 days.

(21) Appl. No.: 13/023,352

(22) Filed: Feb. 8, 2011

(65) Prior Publication Data

US 2012/0204155 A1    Aug. 9, 2012

(51) Int. Cl.
    *G06F 9/44*    (2006.01)
(52) U.S. Cl.
    USPC .......................................... 717/125; 717/124
(58) Field of Classification Search
    None
    See application file for complete search history.

(56) References Cited

U.S. PATENT DOCUMENTS

| | | | | |
|---|---|---|---|---|
| 2010/0303289 A1* | 12/2010 | Polzin et al. | ................... | 382/103 |
| 2011/0154390 A1* | 6/2011 | Smith | ............... | 725/32 |
| 2011/0173204 A1* | 7/2011 | Murillo et al. | ................. | 707/741 |
| 2011/0293075 A1* | 12/2011 | Sharma | ......................... | 379/1.02 |
| 2011/0310041 A1* | 12/2011 | Williams et al. | ............... | 345/173 |

* cited by examiner

*Primary Examiner* — Philip Wang
(74) *Attorney, Agent, or Firm* — Novak Druce Connolly Bove + Quigg LLP

(57) ABSTRACT

Embodiments of methods, systems, apparatuses, and computer-readable may relate to interactive testing of source code. The method may include executing at least a part of the source code at the processing device and presenting the execution to a user. One or more gestures of the user may be captured while executing the part, where the user provides the gestures based on the execution presented to the user. The gestures may then be associated with the executing part, and a report may be generated that comprises information for the executing part associated with the captured gestures.

34 Claims, 7 Drawing Sheets

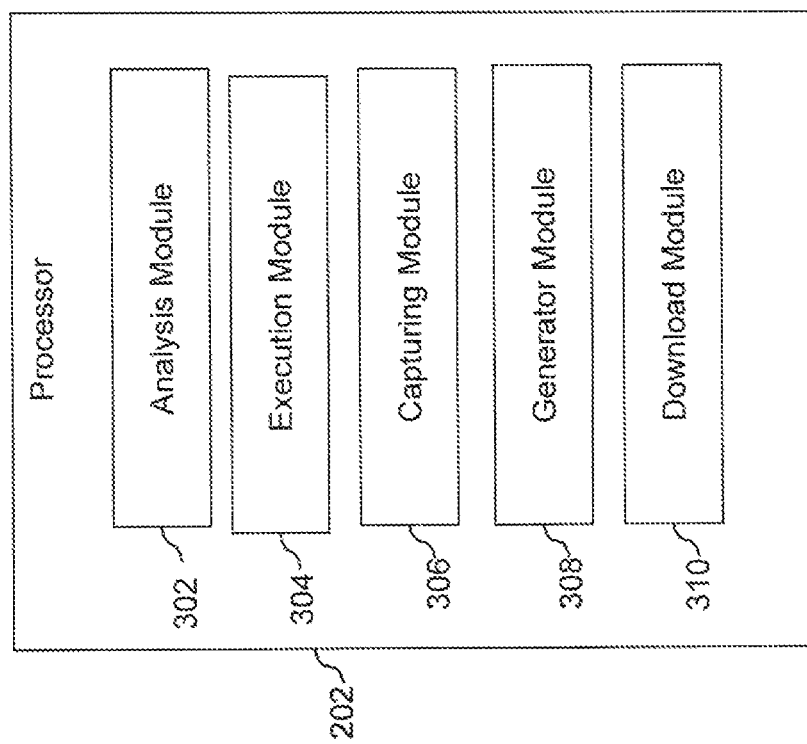

SYSTEMS AND METHODS FOR INTERACTIVE TESTING OF A COMPUTER APPLICATION

FIELD OF THE INVENTION

Embodiments of the invention may relate to testing of computer applications and more specifically to interactive testing of a program code of the computer applications.

BACKGROUND OF THE INVENTION

Generally computer applications require thorough testing to eliminate the bugs or errors. Several different approaches may be used for testing the computer applications. One conventional approach, generally referred to as beta testing, involves distributing the application to groups of users, who use the application and report the errors to software developers. Although this approach of testing is commonly used in the software industry, it can be very time consuming. In addition, beta testing can be extremely difficult to control, particularly when a large number of users are involved in testing. Furthermore, due to the non-systematic use of the application, identification of every error may not be possible.

Another conventional technique for verifying and testing the applications involves using automated software testing alone or in combination with beta testing. Automatic testing generally consists of dynamically verifying that a program is consistent with a detailed specification of its behavior. The automatic testing software executes repeatedly with various inputs that are set to a value or a range. The inputs can be, for example, alpha-numeric values. However, generation of automatic testing software generally requires access to the source code of the application. In addition, such automatic testing software requires an in-depth knowledge of the application. Further, once the errors are determined, the developer is required to track down the exact code causing that error and correct it.

In light of the above discussion, techniques are therefore desirable to interactively test the computer applications.

SUMMARY

Embodiments of the invention may provide a method for interactive testing of a source code of a computer application at a processing device. Operationally, the method may include: executing at least a part of the source code at the processing device, wherein the execution is presented to a user; capturing one or more gestures of the user while executing the part, wherein the user provides the gestures based on one or more performance parameters of the executing part; associating the gestures with the executing part; and generating a report comprising information for the executing part associated with the captured gestures.

Embodiments of the invention may further provide an apparatus for interactive testing of a source code of a computer application. The apparatus may include a memory for storing at least a part of the source code and may also include a processor coupled to the memory, wherein the processor is configured to: execute at least a part of the source code at the processing device, wherein the execution is presented to a user; capture one or more gestures of the user while executing the part, wherein the user provides the gestures based on one or more performance parameters of the executing part; associate the gestures with the executing part; and generate a report comprising information for the executing part associated with the captured gestures.

Embodiments of the invention may further provide a computer-readable medium having stored thereon instructions that, if executed by a processor, cause the processor to execute a method for interactive testing of a source code of a computer application. The method may include executing at least a part of the source code at the processing device, wherein the execution is presented to a user; capturing one or more gestures of the user while executing the part; wherein the user provides the gestures based on one or more performance parameters of the executing part; associating the gestures with the executing part; and generating a report comprising information for the executing part associated with the captured gestures.

Embodiments of the invention may provide a system for interactive testing of a source code of a computer application; the system may include means for executing at least a part of the source code at the processing device, wherein the execution is presented to a user; means for capturing one or more gestures of the user while executing the part, wherein the user provides the gestures based on one or more performance parameters of the executing part; means for associating the gestures with the executing part; and means for generating a report comprising information for the executing part associated with the captured gestures.

BRIEF DESCRIPTION OF THE DRAWINGS

Figure 1:
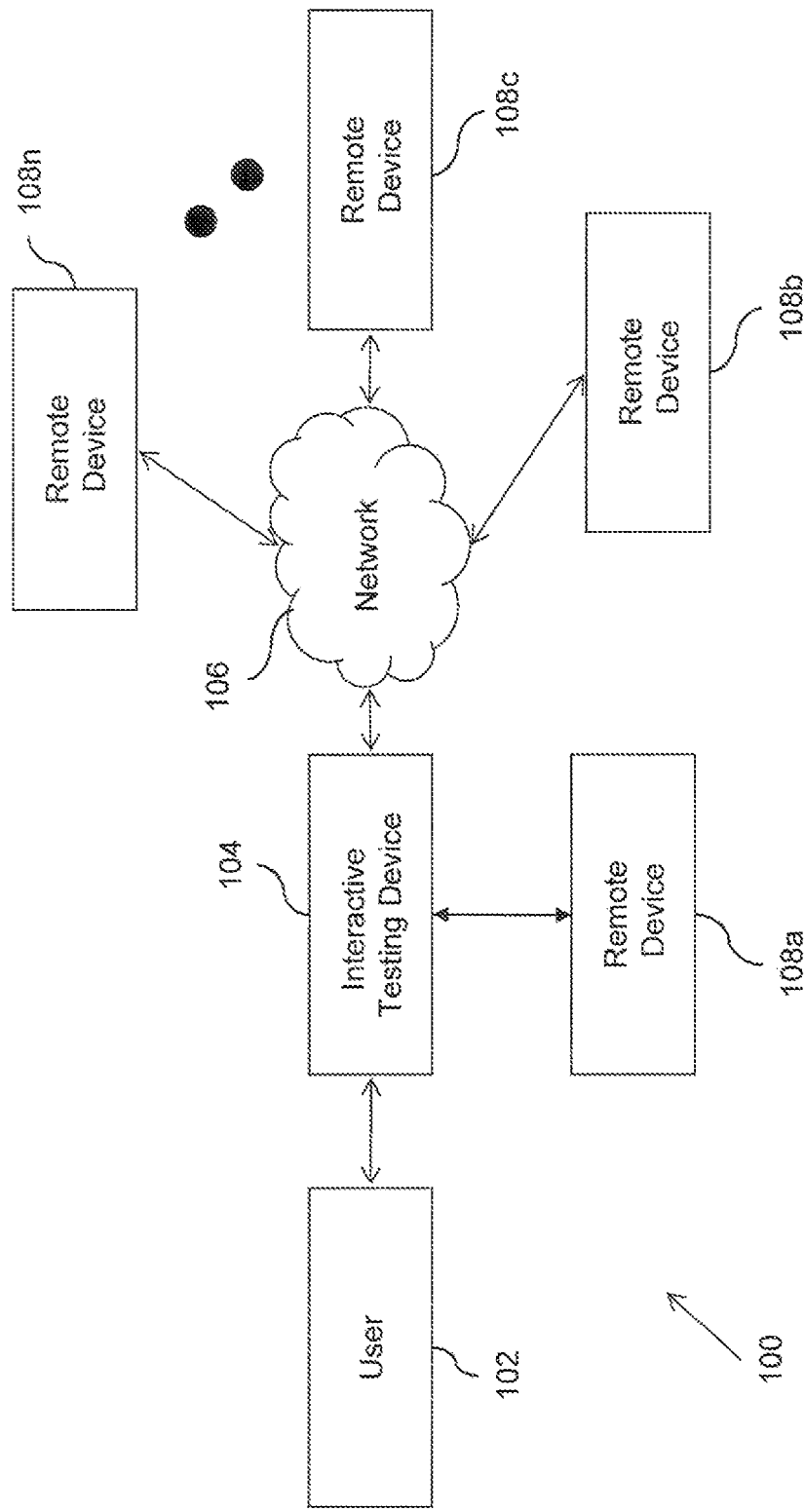
Figure 2:
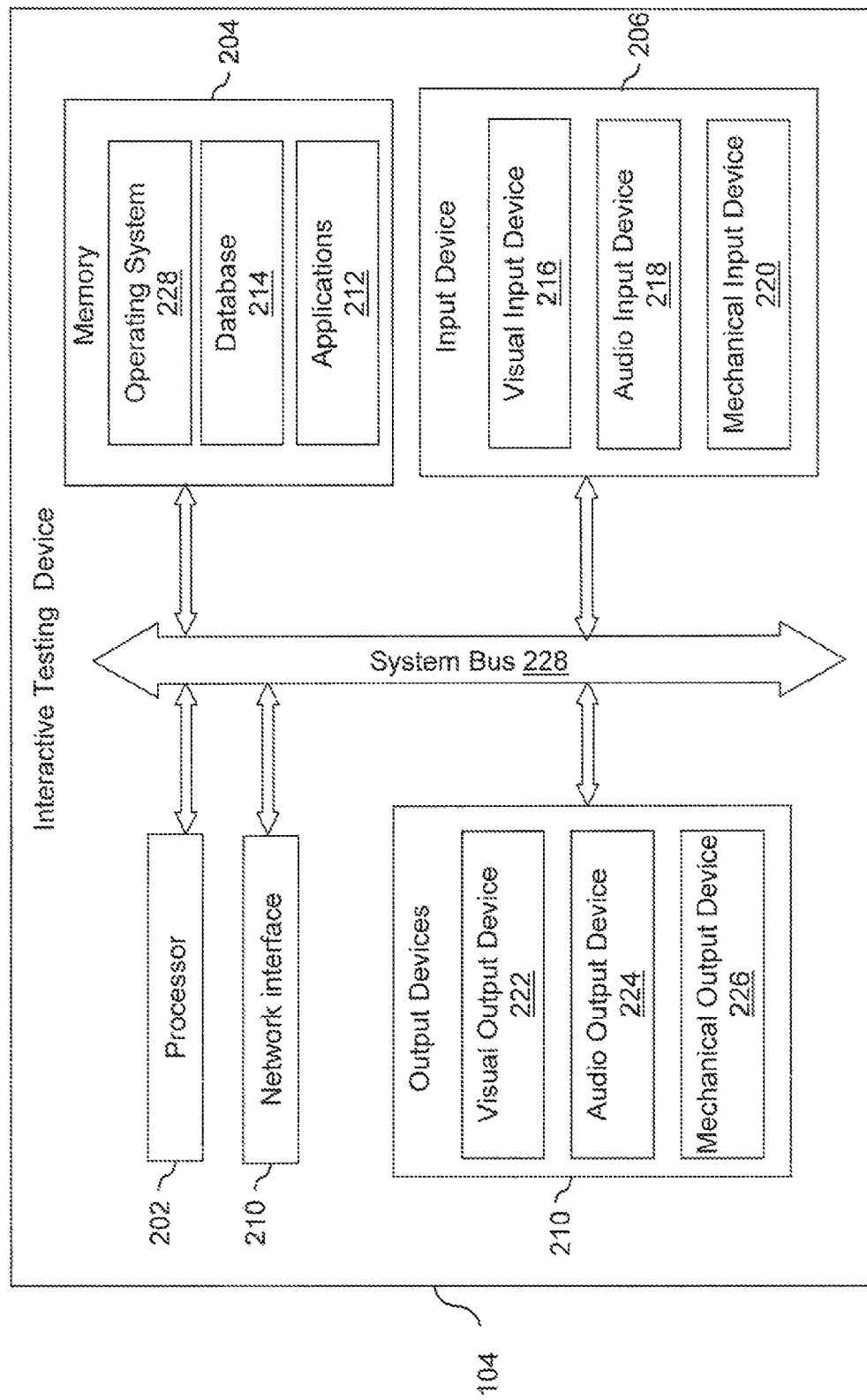
Figure 4A:
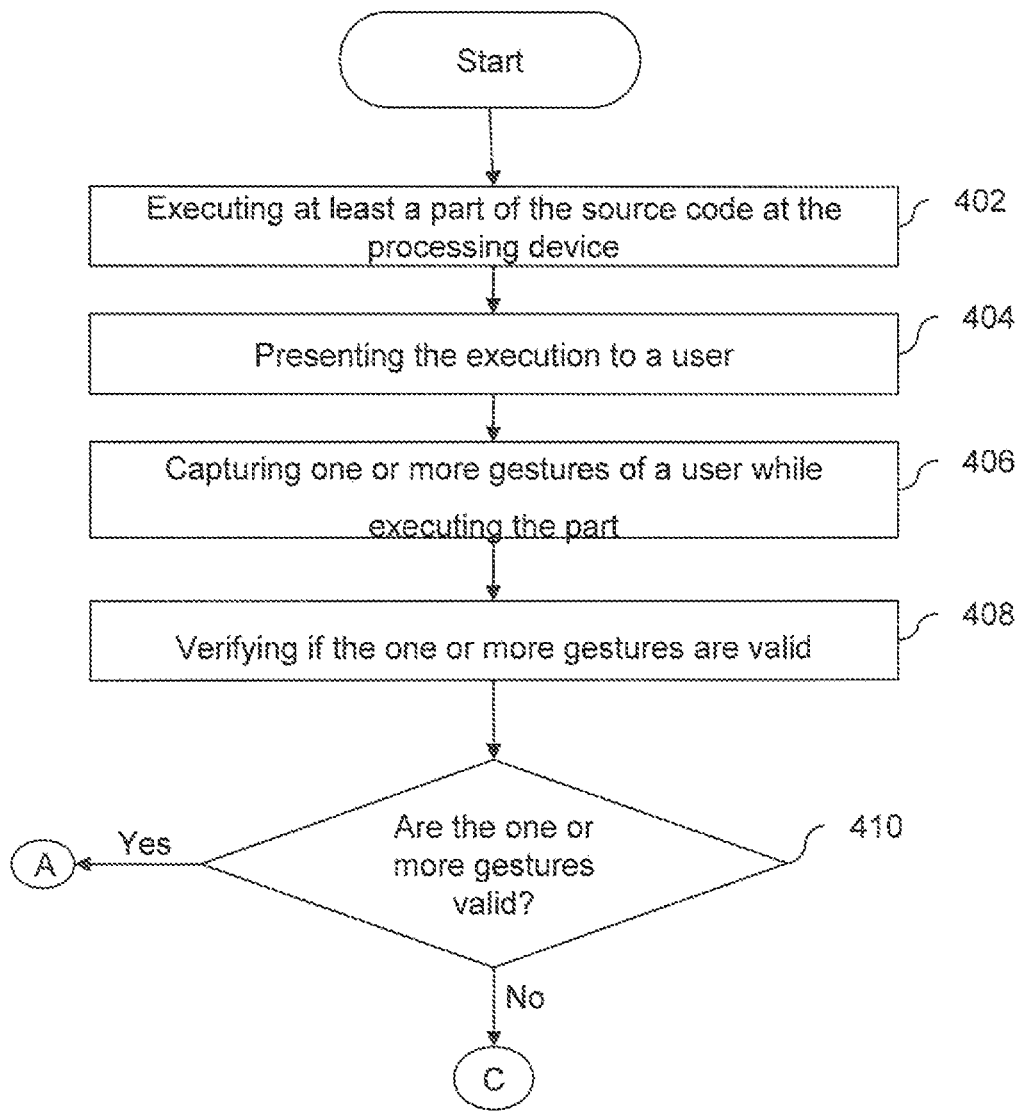
Figure 4B:
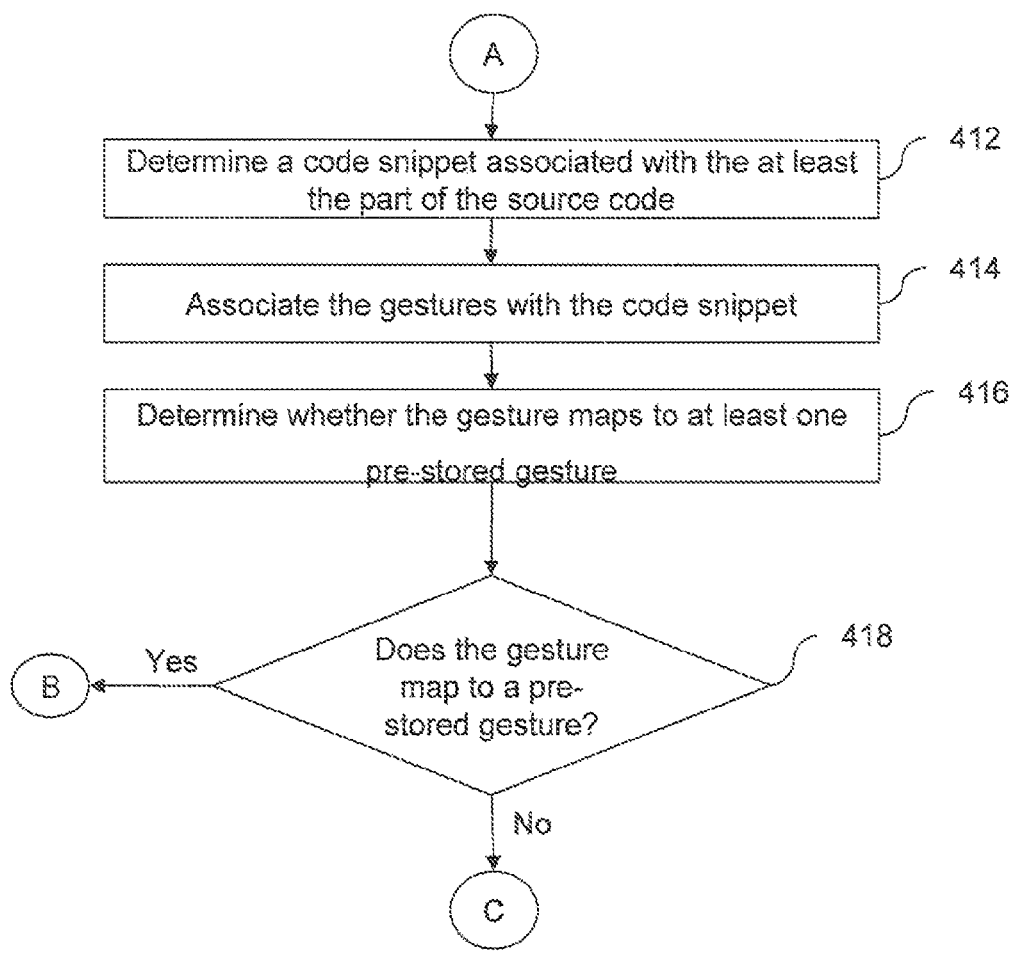
Figure 4C:
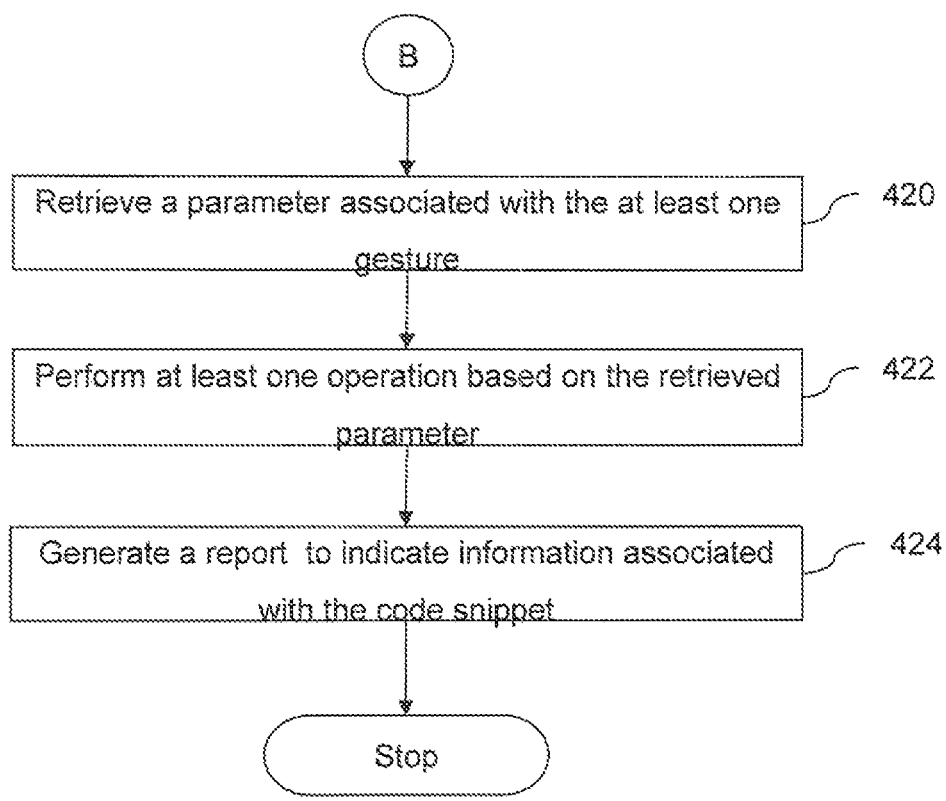
Figure 4D:
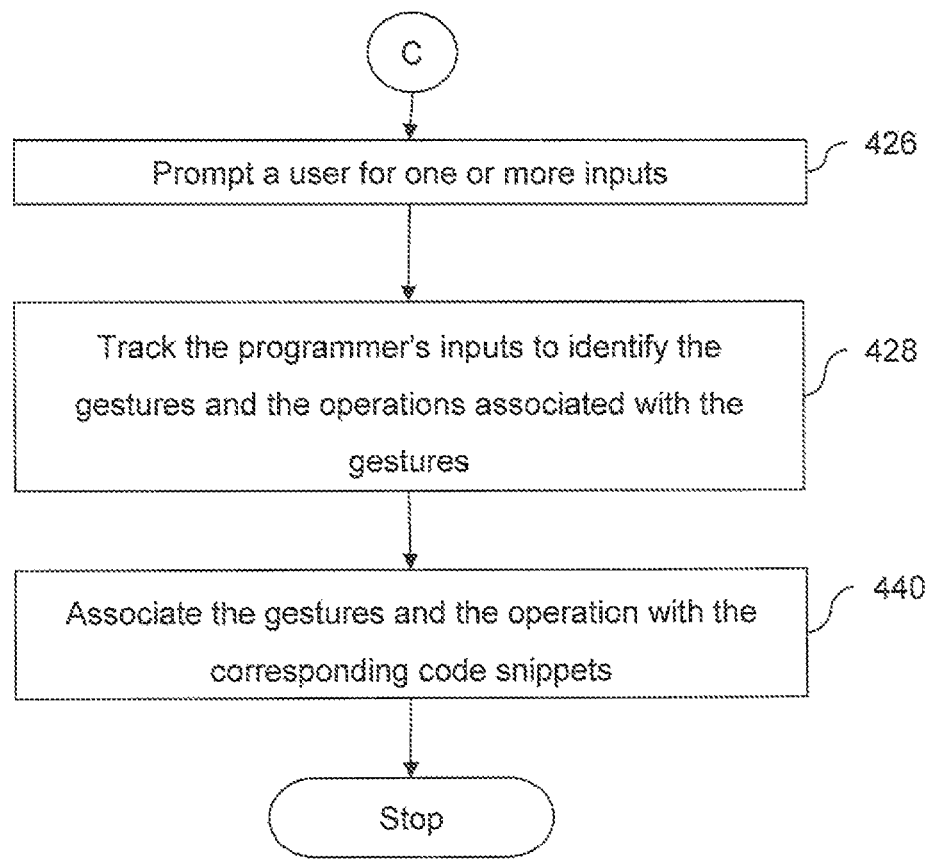

Having thus described the invention in general terms, reference will now be made to the accompanying drawings, which are not necessarily drawn to scale, and wherein:

FIG. 1 illustrates an environment where various embodiments of the invention may function;

FIG. 2 illustrates a block diagram showing exemplary components of an electronic device for implementing the invention, in accordance with an embodiment of the invention;

FIG. 3 illustrates various components of a translator for managing translation, in an embodiment of the invention; and FIGS. 4A, 4B, 4C, and 4D are flowcharts illustrating a method for managing translation of a computer program source code in accordance with an embodiment of the invention.

DESCRIPTION OF EMBODIMENTS OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an exemplary environment 100 where the embodiments of the invention may function. Generally, a computer application can be tested by using manual or automated scripts for bugs and errors. The errors or bugs may result from, for example, the errors in programming code or source code of the computer application.

As shown with reference to FIG. 1, a user 102 may test the computer application by using an interactive testing device 104 (hereafter referred to as testing device 104). Examples of testing device 104 may include, but are not limited to, a personal computer, a laptop, a mobile phone, a smart phone, and so forth. User 102 may test the computer application by providing various gestures to testing device 104. Examples of the gestures include, but are not limited to, hand movements, head movements, smiling or frowning faces, voice commands, haptic feedback, and so forth. A person with skill in the art will appreciate that these are only illustrative examples of the gestures that can be used. Therefore, when user 102 encounters any error while executing the computer application, the gestures may be provided to testing device 104 for identifying the part of the programming code that may have caused the error. Subsequently, testing device 104 may process the identified part with errors to generate testing reports.

As shown, testing device 104 may communicate with remote devices 108a-n directly or through a network 106. Examples of network 106 include, but are not limited to, a Local Area Network (LAN), Wireless Local Area Network (WLAN), and so forth. Further, testing device 104 may communicate with remote devices 108a-n through Bluetooth, Infrared, and so forth. Remote devices 108a-n can be for example, a computer, a display, a printer, or any other hardware that may assist testing device 104 in testing the computer application. Moreover, remote device 108a-n may be used for collaborative or distributive testing of the computer application. Therefore, the computer application may be executed in parallel on testing device 104 and remote device 108a-n for testing. Various exemplary components of testing device 104 are explained in detail with reference to FIG. 2.

FIG. 2 illustrates various exemplary components of testing device 104, according to an embodiment of the invention. As shown, testing device 104 may include a processor 202, a memory 204, input devices 206, output devices 208, and a network interface 210.

Memory 204 may store an application 212 that may be tested interactively by user 102. Moreover, memory 204 may store an Operating System. Further, memory 204 may be connected to a database 214. In an embodiment of the invention, database 214 may be stored in memory 204. In another embodiment of the invention, database 214 may be stored at an external device. Database 214 may include information about various gestures, application 212 and so forth. Examples of memory 204 include, but are not limited to, a Random Access Memory (RAM), a cache, a Dynamic RAM (DRAM), a Static RAM (SRAM), hard disk drives, portable drives, and so forth. Typically, although not necessarily, operation of memory 204 in storing and retrieving data may be governed by commands from processor 202. The memory 204 may further store instructions, which when executed by processor 202, may result in interactive testing of an application program, as disclosed by the teachings of the disclosure herein.

Further as shown in FIG. 2, input devices 206 and output devices 208 may include various visual, audio and/or mechanical input and output devices. As shown, input devices 206 may include a visual input device 216, for example, an optical sensor (for example, a camera), an audio input device 218, for example, a microphone, and/or one or more mechanical input devices 220, for example, a flip sensor, a keyboard, a keypad, a selection button, a touch pad, a touch screen, a capacitive sensor, a motion sensor, a switch and so forth. Output devices 206 may include a visual output device 222, for example, a liquid crystal display or a light emitting diode display, one or more audio output devices 224, for example, a speaker, an alarm and/or a buzzer, and/or one more mechanical output devices 226, for example, a vibrating mechanism, a printer, and so forth.

Network interface 210 may be used to connect testing device 104 to other devices over network 106. Examples of network interface 210 may include, but are not limited to, a Network Interface Card (NIC) with a wireless port and/or Ethernet port and so forth. The components may be connected through a system bus 228. Further, system bus 228 may communicate various instructions between processor 202 and memory 204.

FIG. 3 illustrates exemplary components of processor 202, in accordance with an embodiment of the invention. Application 212 may be tested in real-time while executing on testing device 104. Therefore, user 102 may not be required to search and read or amend the source code after testing application 212. For example, while application 212 such as a computer game is executing on testing device 104, a control may malfunction. Therefore, user 102 may provide gestures as input to indicate the malfunction. Subsequently, a part of the source code that corresponds to that control may be automatically identified. As a result, user 102 may not be required to search and edit or amend the code later.

Processor 202 may include an analysis module 302 that may perform a pre-test analysis of the source code of application 212. In case of pre-test analysis, the source code may be parsed to index multiple parts of the source code, such as features and/or code snippets. The analysis may be performed to index or identify each part of the source code that is being executed at a particular time instance. An execution module 304 of processor 202 may execute the source code and may present the execution to user 202 of testing device 104. More particularly, execution module 304 may provide the output to user 202 using one or more of output devices 208.

A capture module 306 of processor 202 may capture one or more gestures from user 102, e.g., while execution module 304 presents the output of application 212. Capture module 306 may use input devices 206 for capturing the gestures from user 102 while the output is presented to user 102. User 102 may provide gestures based on predefined performance parameters, such as execution time, range of output, correctness of output, etc.

Analysis module 302 may validate each received gesture and may associate the received gestures with the indexed code snippets. The analysis module may validate the received gestures against one or more parameters such as, but not limited to, a minimum gesture time, an identity of the user of interactive testing device 312, and other visual/audio or haptic parameters, based in the inputs device used for capturing the gestures.

Execution module 304 may also identify an operation associated with a validated gesture and may then perform the corresponding operation on the code snippet. For example, if the operation indicates that the output did not meet the user's expectations, execution module 304 may highlight the associated code snippet to illustrate this information to the user, e.g., in the form of a report, which may be generated by generator module 308.

Generator module 308 may generate a report based on the analysis and processing that may be performed by analysis module 302 and execution module 304, respectively. For example, the report may include information such as the captured gestures associated with a code snippet, a number of instances that did and did not meet the user's expectations, a location, such as line number of the code snippet in the source code, and so forth. For instance, the information may be in a form such that a user or a programmer can interact with and select the code snippets.

For example, if user 102 is viewing an output from an execution that does not meet his/her expectations, user 102 may be able to simply nod his/her head horizontally, and capture module 306 may then capture this gesture. Subsequently, analysis module 302 may validate this horizontal head nodding gesture against the pre-stored parameters. Once the gesture is verified, execution module 304 may perform the operation associated with the gesture, on the corresponding code snippet. Thereafter, generator module 308 may generate a report based on functions performed by analyzing module 302, execution module 304, and/or capturing module 306.

Processor 202 may also include a download module 310 to download executable instructions for performing the above mentioned processes. In an embodiment of the invention, download module 310 may download the instructions via a communication network, such as the Internet, and/or from one or more storage media.

Alternatively, such executable instructions may be provided for downloading to another device. In such an embodiment, the executable instructions may be stored in a storage medium, such as RAM, ROM, various types of disks, etc., for access by a server and downloading to such another device.

Even though the modules have been shown comprised within the processor 202, people with ordinary skill in the art would appreciate that these modules can exist as independent hardware, software, or firmware or a combination thereof, and may further be performed at a single hardware device or a combination of hardware devices at multiple devices.

With reference to FIGS. 4A, 4B, 4C, and 4D, a flow diagram for interactive testing of a source code, according to an embodiment of the invention, is depicted. The process depicted can also be implemented in a processing device capable of performing interactive testing of a program code. Further, it should also be realized that the process may include functionality that may be performed in hardware, firmware, software, or a combination thereof and may further be performed at a single hardware device or a combination of hardware devices at multiple devices. Also, one or more steps of the process can be facilitated by supporting external hardware units. Further, the various steps in the process may be executed by processor 202.

Interactive testing of the source code of a computer application may be desired. The source code may have been previously indexed to identify code snippets associated with respective outputs generated by execution of the source code. At step 402, processor 202, which may be comprised in testing device 104, may execute at least a part of the source code. At step 404, processor 202 may present the execution to user 102 of the testing device 104. For presenting the execution to user 102, processor 202 may use one or more output devices 206, such as visual output device 222, audio output device 224, and/or mechanical output device 226. These devices can be used independently or in combination with each other.

While the execution is being presented to user 102, the processor 202 may simultaneously capture 406 one or more gestures of user 102 of interactive testing device 104, using one or more input devices 218 such as visual input device 216, audio input device 218, and/or mechanical input device 220. These devices can be used in independently or in combination with each other. User 102 of interactive testing device 104 can customize multiple parameters associated with these gestures. The gestures may be provided based on the user's evaluation of the execution of the part of the source code.

In one embodiment, processor 202 may present an output generated by the execution of a part of the source code to user 102, and user 102 may accept or reject the output simply by using gestures such as, for example, horizontal or vertical nodding of the head, a smiling face or a frowning face, by drawing a cross on a touchscreen or touchpad, by voice commands, or by tapping specific buttons on a keyboard. Moreover, user 102 might tentatively accept or tentatively reject the output by providing the system with other gestures. A person with skill in the art would appreciate that these are only a few illustrative examples, and these should not be construed in a manner that limits the scope of the invention.

Once processor 202 captures one or more gestures from user 102, processor 202, at step 408, may verify the validity of the captured gestures. The validity of the gestures can be verified based on multiple parameters. If processor 202 fails to validate the captured gesture, the method may continue to step 426. In one embodiment, the processor might fail to validate the captured gesture, for example, if the captured gesture is not presented to the system for a minimum threshold of time, or if more than one gesture is provided.

If processor 202 determines that the captured gestures are valid, the process may switch to step 412. At step 412, processor 202 may determine a code snippet associated with the execution. Subsequently at step 414, the processor 202 may associate the captured gesture with the identified code snippet. Then, processor 202 may query a database 214 that may contain stored gestures to determine at least one pre-stored gesture that maps/matches to the captured gestures. If processor 202 fails to determine a pre-stored gesture that maps to the captured gesture, then the process may switch to step 426. The term "pre-stored gesture" used herein refers to a gesture that was previously captured during the interactive testing of a code or initially programmed for interactive testing.

If processor 202 determines a pre-stored gesture that maps to the captured gesture, processor 202, may perform at least one operation on the code snippet associated with the pre-stored gesture. The at least one operation may be an operation such as, but not limited to, highlighting the code snippet as accepted, highlighting the code snippet as rejected, highlighting the code snippet for automated error correction, highlighting the code snippet for manual error correction, or highlighting the code snippet for tentative acceptance/tentative rejection.

Once processor 202 has performed all the associated operations, processor 202, at step 424, may generate a report that may describe one or more of the following: a description of the captured gesture, the code snippet associated with the captured gesture, a pre-stored gesture that maps to the captured gesture, an operation associated with the pre-stored gesture, an indicator associated with the pre-stored gesture, and/or a location of the code snippet associated with the captured gesture.

If processor 202 fails to validate the captured gesture, the process may continue to step 426. At step 426, user 102 may be prompted to manually validate the captured gesture or to re-enter another gesture. In one embodiment, user 102 may enter a new threshold time, wherein the threshold time is the minimum time for which the user must present the gesture to the system. Once the user has validated the captured gesture, the process may switch back to step 412 (not shown). If user 102 re-enters the gesture, the method may switch back to step 410 (not shown).

The process can also switch to step 426 if processor 202 fails to determine a pre-stored gesture that maps to a captured gesture. At step 426, processor 202 may prompt the user to manually update a definition for the captured gesture. Thereafter, at step 428, user 102 may enter a definition associated with the gesture and an operation associated with the gesture. Processor 202 may then update database 214 to indicate the one or more inputs. At step 440, processor 202 may associate the received definition and operation with the code snippet associated with the execution. Thereafter, whenever a similar gesture is captured, the description and operation provided by the user can be associated with the captured gesture.

While the invention has been described in connection with what are presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method for interactive testing of source code of a computer application at a processing device, the method comprising:

executing at least a part of the source code at the processing device, wherein the execution is presented to a user;

capturing one or more gestures of the user while executing the at least a part of the source code, wherein the user provides one or more gestures based on the execution with each gesture indicating an acceptance or rejection of the executed source code;

associating the one or more captured gestures with an executing part of the source code; and generating a report comprising information for the executing part associated with the one or more captured gestures.

2. The method of claim 1, wherein the executing part comprises one or more code snippets.

3. The method of claim 2, wherein the information comprises at least one of a location of a code snippet in the source code or a description of the executing part associated with the captured gestures.

4. The method of claim 1, wherein the one or more gestures comprise one or more of a hand gesture, a face gesture, or a voice command.

5. The method of claim 1, further comprising validating the one or more captured gestures.

6. The method of claim 5, wherein validating the one or more gestures comprises:

comparing a captured gesture to one or more stored gestures in a database; and prompting the user for one or more inputs, if the captured gesture does not match a stored gesture.

7. The method of claim 6, wherein the one or more stored gestures were previously captured and validated.

8. The method of claim 6, further comprising:

associating the one or more inputs with the one or more captured gestures; and updating the database based on the association of the inputs with the captured gestures.

9. The method of claim 6, further comprising:

retrieving a parameter associated with one or more of the stored gestures, if a captured gesture matches one or more of the stored gestures; and performing at least one operation on a code snippet associated with the executing part, based on the retrieved parameter.

10. The method of claim 1, further comprising providing for downloading instructions that, if executed by a processor, cause the processor to execute operations corresponding to said executing, said capturing, said associating, and said generating.

11. The method of claim 1, further comprising downloading instructions that, if executed by a processor, cause the processor to execute operations corresponding to said executing, said capturing, said associating, and said generating.

12. An apparatus for interactive testing of a source code of a computer application, the apparatus comprising:

a memory for storing at least a part of the source code;

a processor coupled to the memory, wherein the processor is configured to:

execute at least a part of the source code, wherein the execution is presented to a user;

capture one or more gestures of the user while executing the at least a part of the source code, wherein the user provides the one or more gestures based on the execution with each gesture indicating an acceptance or rejection of the executed source code;

associate the one or more captured gestures with an executing part of the source code; and generate a report comprising information for the executing part associated with the one or more captured gestures.

13. The apparatus of claim 12, wherein the memory stores one or more code snippets associated with the at least one part of the source code.

14. The apparatus of claim 12, wherein the processor is further configured to validate one or more captured gestures.

15. The apparatus of claim 14, wherein the processor is further configured to:

compare the one or more captured gestures to one or more stored gestures in a database; and prompt the user for one or more inputs if the one or more captured gestures do not match one or more of the stored gestures.

16. The apparatus of claim 15, wherein the processor is further configured to:

associate the one or more inputs with the one or more captured gestures; and update the database based on the association of the one or more inputs with the one or more captured gestures.

17. The apparatus of claim 15, wherein the processor is further configured to:

retrieve a parameter associated with one or more of the stored gestures if the captured gesture matches one or more of the stored gestures; and perform at least one operation on the code snippet associated with the executing part, based on the retrieved parameter.

18. A non-statutory computer-readable medium having stored thereon instructions that, if executed by a processor, cause the processor to execute operations relating to interactive testing of a source code of a computer application, the operations comprising:

executing at least a part of the source code at the processing device, wherein the execution is presented to a user;

capturing one or more gestures of the user while executing the at least a part of the source code, wherein the user provides the one or more gestures based on the execution with each gesture indicating an acceptance or rejection of the executed source code;

associating the one or more captured gestures with an executing part of the source code; and generating a report comprising information for the executing part associated with the captured gestures.

19. The non-statutory computer-readable medium of claim 18, wherein the at least a part of the source code comprises one or more code snippets.

20. The non-statutory computer-readable medium of claim 19, wherein the information comprises at least one of a location the code snippet in the source code or a description of the executing.

21. The non-statutory computer-readable medium of claim 20, wherein the one or more gestures comprise one or more of a hand gesture, a face gesture, or a voice command.

22. The non-statutory computer-readable medium of claim 21, wherein the operations further comprise validating the one or more captured gestures.

23. The non-statutory computer-readable medium of claim 22, wherein the operations further comprise:
comparing the one or more captured gestures to one or more gestures stored in a database; and
prompting the user for one or more inputs if one or more of the one or more captured gestures do not match the stored gestures.

24. The non-statutory computer-readable medium of claim 23, wherein the operations further comprise:
associating the one or more inputs with the one or more captured gestures; and
updating the database based on the association of the inputs with the one or more captured gestures.

25. The non-statutory computer-readable medium of claim 23, wherein the operations further comprise:
retrieving a parameter associated with one or more of the stored gestures, if one or more of the captured gestures matches the stored gestures; and
performing at least one operation on the code snippet associated with the executing part, based on the retrieved parameter.

26. A system for interactive testing of a source code of a computer application, the system comprising:
means for executing at least a part of the source code, wherein the execution is presented to a user;
means for capturing one or more gestures of the user while executing the at least a part of the source code, wherein the user provides the one or more gestures based on the execution with each gesture indicating an acceptance or rejection of the executed source code;
means for associating the one or more captured gestures with an executing part of the source code; and
means for generating a report comprising information for the executing part associated with the one or more captured gestures.

27. The system of claim 26, wherein the at least one part of the source code comprises one or more code snippets.

28. The system of claim 27, wherein the report comprises at least one of a location of the part of the code snippet, a description of the part of the code snippet, or a pre-stored gesture that maps to one or more gestures.

29. The system of claim 28, wherein the pre-stored gesture was previously captured for interactively testing the source code.

30. The system of claim 26, wherein the gestures comprise one or more of a hand gesture, a face gesture, or a voice command.

31. The system of claim 26, further comprising means for validating the one or more captured gestures.

32. The system of claim 31, wherein the means for validating the one or more captured gestures further comprises:
means for comparing the one or more captured gestures to one or more stored gestures in a database; and
means for prompting the user for one or more inputs if one or more of the one or more captured gestures do not match the stored gestures.

33. The system of claim 31, further comprising:
means for associating the one or more inputs with the one or more captured gestures; and
means for updating the database based on the association of the one or more inputs with the one or more captured gestures.

34. The system of claim 31, further comprising:
means for retrieving a parameter associated with at least one of the stored gestures if at least one of the one or more captured gestures matches the at least one of the stored gestures; and
means for performing at least one operation on a code snippet associated with the executing part, based on the retrieved parameter.

* * * * *